(12) United States Patent
Dingmann

(10) Patent No.: US 11,555,767 B2
(45) Date of Patent: Jan. 17, 2023

(54) HAPTIC FEEDBACK FOR CONFIGURING MATERIALS TESTING SYSTEMS

(71) Applicant: TA Instruments-Waters LLC, New Castle, DE (US)

(72) Inventor: David L. Dingmann, Saint Paul, MN (US)

(73) Assignee: TA Instruments-Waters LLC, New Castle, DE (US)

(*) Notice: Subject to any disclaimer, the term of this patent is extended or adjusted under 35 U.S.C. 154(b) by 0 days.

(21) Appl. No.: 17/356,602

(22) Filed: Jun. 24, 2021

(65) Prior Publication Data
US 2022/0026325 A1 Jan. 27, 2022

Related U.S. Application Data

(60) Provisional application No. 63/055,978, filed on Jul. 24, 2020.

(51) Int. Cl.
*G01N 3/06* (2006.01)
*G01N 11/00* (2006.01)

(52) U.S. Cl.
CPC .......... *G01N 3/062* (2013.01); *G01N 11/00* (2013.01); *G01N 2203/005* (2013.01)

(58) Field of Classification Search
CPC ............ G01N 3/062; G01N 11/00; G01N 2203/005
USPC ...................................................... 73/53.01
See application file for complete search history.

(56) References Cited

U.S. PATENT DOCUMENTS

| | | | |
|---|---|---|---|
| 6,703,999 B1* | 3/2004 | Iwanami | G06F 3/0421 345/157 |
| 8,825,423 B1 | 9/2014 | Brovold | |
| 2003/0057973 A1* | 3/2003 | Nojima | G09B 23/28 324/754.21 |
| 2008/0142708 A1* | 6/2008 | Workman | G01Q 30/04 250/306 |
| 2019/0301990 A1 | 10/2019 | Kauffman et al. | |

FOREIGN PATENT DOCUMENTS

| | | | | |
|---|---|---|---|---|
| CN | 1757591 A | * | 4/2006 | |
| CN | 106535812 A | * | 3/2017 | ............ A61B 1/00 |
| CN | 209086868 U | * | 7/2019 | |
| JP | 2012037420 A | | 2/2012 | |
| WO | WO-2017022466 A1 | * | 2/2017 | ............ A61B 34/74 |

OTHER PUBLICATIONS

International Search Report and Written Opinion in PCT/US2021/038790 dated Oct. 15, 2021.

* cited by examiner

*Primary Examiner* — Marrit Eyassu
(74) *Attorney, Agent, or Firm* — Schmeiser, Olsen & Watts LLP; Victor J. Baranowski

(57) ABSTRACT

Disclosed is a material testing system that includes an output shaft configured to be moved by operation of a motor, the output shaft coupleable to a test specimen such that movement of the output shaft imparts a mechanical force on the test specimen. The material testing system includes a haptic feedback system configured to provide an operator of the material testing system haptic feedback related to a position or state of the output shaft relative to the test specimen during setup. Methods of testing using haptic feedback are also disclosed.

20 Claims, 13 Drawing Sheets

HAPTIC FEEDBACK FOR CONFIGURING MATERIALS TESTING SYSTEMS

RELATED APPLICATION

This application claims the benefit of the earlier filing date of U.S. Provisional Patent Application Ser. No. 63/055,978 filed Jul. 24, 2021 and titled "Haptic Feedback for Configuring Materials Testing Systems," the entirety of which is incorporated herein by reference.

FIELD OF THE INVENTION

The invention relates generally to material testing. More particularly, the invention relates to a material testing system that provides feedback to assist in set up and configuration.

BACKGROUND

Material testing systems typically include one or more shafts or other load applying actuators that extends to a clamp or holding device within which a test specimen may be placed or otherwise received prior to testing. When setting up such a material testing machine, a process may require an operator to follow several steps, each requiring a different position of the actuator(s). An operator typically adjusts the position of the actuator(s) either via an instrument control panel, or by manipulating an actuator, or output shaft thereof, by hand. When manipulating the actuator by hand, an operator is required to split their attention between a gauge or GUI display of the position and/or load on the actuator(s) and the clamp or holding device. This splitting attention can lead to longer set up times, errors in set up, and in some cases unintentional damage to the system and/or test specimen.

Thus, material testing system that provides user aid in set up and configuration would be well received in the art.

SUMMARY

In one exemplary embodiment, a material testing system includes an output shaft configured to be moved by operation of a motor, the output shaft coupleable to a test specimen such that movement of the output shaft imparts a mechanical force on the test specimen; and a haptic feedback system configured to provide an operator of the material testing system haptic feedback related to a position or state of the output shaft relative to the test specimen during setup.

Additionally or alternatively, the output shaft is configured to provide the haptic feedback to the operator by way of a tactile response sent through the output shaft.

Additionally or alternatively, the tactile response includes moving the output shaft by the motor.

Additionally or alternatively, the tactile response is a low energy vibration in the output shaft.

Additionally or alternatively, the output shaft is movable by an indirect controller used by the operator, wherein the indirect controller is configured to adjust the position of the output shaft during setup, and wherein the indirect controller is configured to provide the haptic feedback to the operator by way of a tactile response sent through the indirect controller.

Additionally or alternatively, the tactile response is configured to simulate a sample response in a test space of the material testing system by increasing the tactile response when the output shaft contacts the test specimen.

Additionally or alternatively, the material testing system is at least one of an axial loading system, a torsion loading system, a dynamic mechanical analysis system, and a rheometer system.

Additionally or alternatively, the haptic feedback system is configured to provide a first tactile response to indicate that a position of the output shaft or load on a sample is met.

Additionally or alternatively, the haptic feedback system is configured to provide a second tactile response at or near a movement or force limit of the output shaft for the setup, wherein the second tactile response is different than the first tactile response.

Additionally or alternatively, the first and second tactile responses are responses selected from the group consisting of a single pulse, rapid successive pulses, an increased resistive force to further movement of the output shaft, pulses that repeat at predetermined time intervals, and a resistive force that is proportional to position of the output shaft.

In another exemplary embodiment, a material test system includes a first specimen contact body; a second specimen contact body, wherein a test specimen is configured to be placed between the first specimen contact body and the second specimen contact body; and an output shaft attached to and extending from the first specimen contact body, the output shaft configured to be moved by operation of a motor, wherein the output shaft is configured to provide haptic feedback to an operator touching the output shaft during setup of a test process.

In another exemplary embodiment, a method of material testing includes: providing a material testing system including an output shaft; receiving, by the material testing system, a test specimen; setting up a test process for the test specimen by moving the output shaft relative to the test specimen; and providing haptic feedback to an operator of the material testing system related to a position or state of the output shaft relative to the test specimen during the setting up.

Additionally or alternatively, the method further includes providing, by the output shaft, the haptic feedback by way of a low energy vibration sent through the output shaft.

Additionally or alternatively, the method further includes controlling the low energy vibration sent through the output shaft by a motor that is configured to move the output shaft during testing.

Additionally or alternatively, the method further includes moving the output shaft by an indirect controller used by the operator; adjusting the position of the output shaft during setup with the indirect controller; and providing the haptic feedback to the operator by way of a tactile response sent through the indirect controller.

Additionally or alternatively, the method further includes simulating, by the indirect controller, a sample response in a test space of the material testing system by increasing the tactile response when the output shaft contacts the test specimen.

Additionally or alternatively, the method further includes at least one of: performing, by the material test system, an axial load test on the test specimen; performing, by the material test system, a torsion loading test on the test specimen; performing, by the material test system, a dynamic mechanical analysis on the test specimen; and performing, by the material test system, a rheometric test on the test specimen.

Additionally or alternatively, the method further includes providing a first tactile response to the operator; and indicating, with the first tactile response, that a position of the output shaft is met.

Additionally or alternatively, the method further includes providing a second tactile response to the operator; and indicating, with the second tactile response, a movement limit of the output shaft for the setup, wherein the second tactile response is different than the first tactile response.

Additionally or alternatively, the providing the first tactile response and the second tactile response further comprising at least one of: providing at least one of a single pulse; providing rapid successive pulses; providing an increased resistive force to further movement of the output shaft; providing pulses that repeat at predetermined time intervals; and providing a resistive force that is proportional to position of the output shaft.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
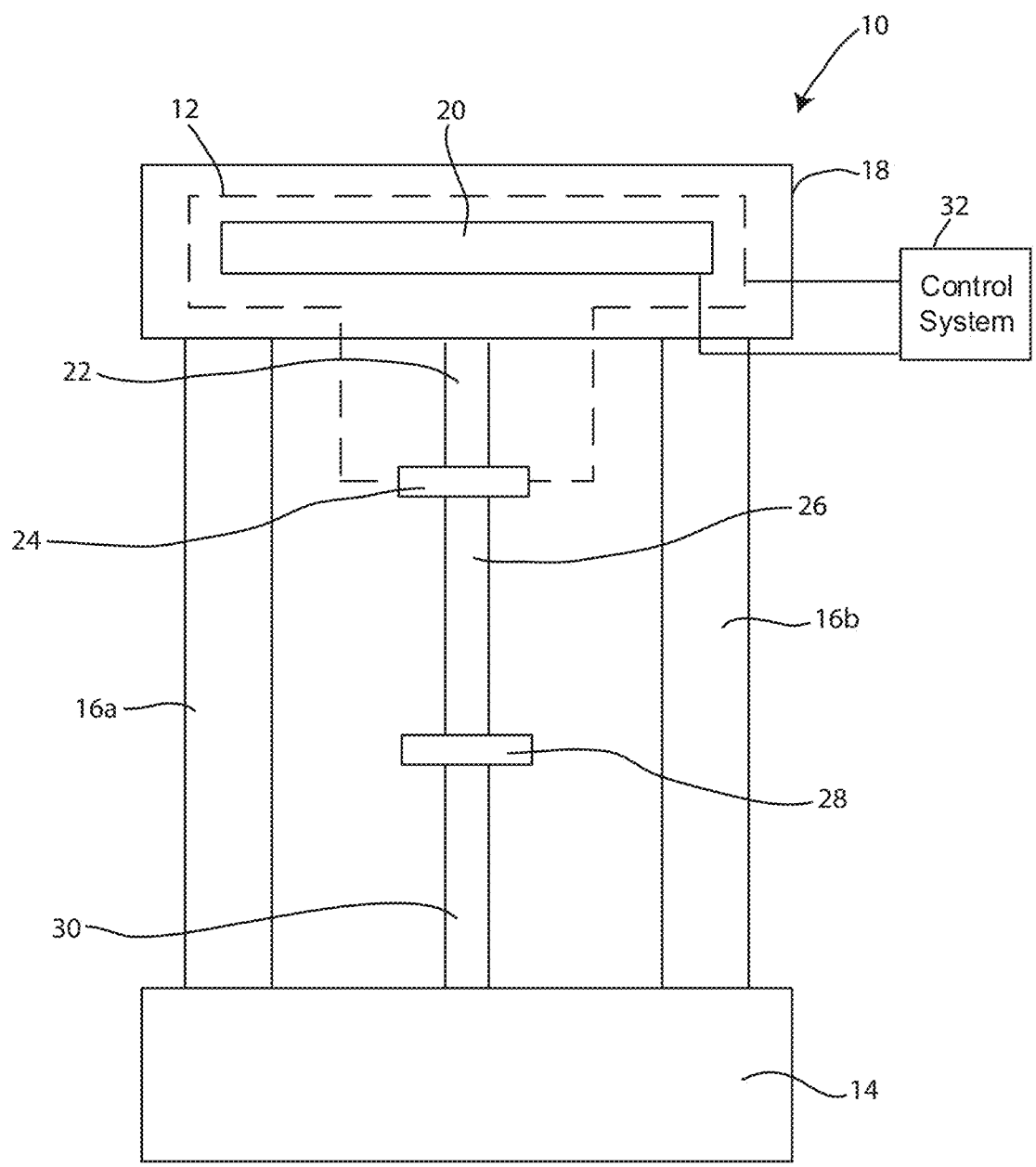
FIG. 1 depicts a schematic view of a material testing system having a haptic feedback system, in accordance with one embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

In brief overview, the invention relates to testing systems that provide haptic feedback to an operator as predefined setup positions or system limits are reached. For systems in which an operator is manually moving a shaft of an actuator by hand, it is contemplated to configure the system's actuator to provide various forms of haptic feedback for various conditions. For example, when an actuator shaft is moved to a certain point (e.g. 10 mm from center) the actuator may be configured to provide a haptic "tap" to let the user know that a particular point has been reached.

If there are displacement or force limits that the operator has set with the system, the haptic feedback may be provided to either be a more insistent (e.g. higher frequency) set of taps or may provide a resistive force that proportionally increases as the operator nears the limit. This may both communicate the limit to the operator via a tactile response as well as to help prevent the operator from actually exceeding the limit.

Some material testing systems are capable of operating at very high forces. These systems may be unsafe to set up by hand with power on or it may be that the forces required to move the actuator are too great to achieve by hand. In such systems, it is contemplated to apply the haptic feedback responses to indirect (e.g. handheld) controllers used by an operator. In such controllers, there may be a system analog (e.g. a scroll wheel, touch pad, joystick, etc.) which is used to adjust the actuator position. It is contemplated to set up this analog to provide haptic feedback to the operator. This may provide a user with a simulated experience to mimic the resistance of the test specimen as the clamp comes in contact with the test specimen. Such a simulated experience may be based on the measured loads and displacements from the existing system sensors.

A "material testing system" as described herein include any type of system for performing material testing by applying force to any test specimen or sample. Material testing systems may be load frames using electro-magnetic linear motors. Examples of such devices include the ElectroForce™ series of test instruments from TA Instruments™. Material testing systems may include multi-specimen fatigue testing systems, cardiovascular test instruments, and/or tissue engineering instruments. Both vertical axis actuator systems and horizontal axis actuator systems are also contemplated. Still further, rheological instruments which apply stress or strain on a deformable material, such as rheometers, are contemplated.

A "haptic feedback system" as described herein is a system configured to provide a communication to an operator that is received by the operator through the sense of touch. Haptic feedback systems described herein may be configured to provide haptic feedback such as one or more of forces, vibrations, motions or any other tactile response, to an operator of the material testing system. Tactile responses may be provided by the haptic feedback system to the operator in response to an operator's input—e.g. when an operator moves an actuator or clamps a test specimen or sample into the material testing system.

Referring now to the Figures, FIG. 1 depicts a schematic view of a material testing system 10 having a haptic feedback system 12, in accordance with one embodiment. The material testing system includes a base 14 from which two frame posts 16a, 16b extend. The posts 16a, 16b extend to a linear motor housing unit 18 within which a linear motor 20 resides. Extending downward from the linear motor 20 and the housing unit 18 is a vertically aligned output shaft 22. The output shaft 22 extends to an upper clamp mechanism 24 that is configured to interface, hold or otherwise clamp a test specimen 26, which represents any sample testable by the material testing system 10. The test specimen 26 is held between the upper clamp mechanism 24 and a lower clamp mechanism 28 which extends from a lower shaft 30 that is attached to the base 14 and extends upward therefrom.

The material testing system 10 is shown to be a single motor system in which a single axis, i.e. the vertical output shaft 22, is configured to move vertically during a testing sequence. However, other embodiments of vertically aligned material test systems are contemplated in which the haptic feedback systems described herein may be applicable. For example, a vertically aligned material test system may include two linear motors: one to move the vertical output shaft 22 and the other to move a vertical output shaft extending from below to the lower clamp 28.

Force sensors may located within the base 14 and/or mounted above the base 14 in order to detect forces transferred to the lower shaft 30 through the application of force on the test specimen 26 by the movement of the output shaft 22 and the resulting force transfer to the lower clamp 28. Additionally force sensors and/or a displacement sensor may be mounted within the unit 18 configured to detect force on, and/or displacement of, the output shaft 22. The material testing system 10 may include various sensors in order to test the physical properties of test specimens, such as the test specimen 26.

A control system 32 may be connectable to the material testing system 10. The control system 32 may be connected to the linear motor 20 unit and the sensor system of the material testing system 10 via a wired or wireless connection. The control system 32 may include one or more external computing devices running control software configured to control the material testing system 10. The software of the control system 32 may be used by an operator to view and interpret the information gathered by the material testing system 10 during a testing sequence. Further, the software of the control system 32 may be used by the operator to program or control the material testing system 10 prior to and/or during a testing sequence. The control system 32 may further be connected to the haptic feedback system 12. The control system 32 may be capable of programming the haptic feedback system 12, in order to customize the tactile responses, and conditions for the haptic feedback system 12 to provide a tactile response to an operator.

In operation, the material testing system 10 may be configured to receive the test specimen 26 located between a clamp system that includes the two clamps 24, 28. The clamps 24, 28 may be removably attachable to the output shaft 22 and the lower shaft 30, respectively. An operator (not shown) may be required to move the output shaft 22 by hand during the setup process either before or after the test specimen 26 is in place between the clamps 24, 28. The haptic feedback system 12 may be configured to provide the operator with haptic feedback and/or tactile responses as the operator reaches predefined setup positions and/or system limits. For example, when the output shaft 22 is moved to a certain point (e.g. 10 mm from center) the output shaft 22 may provide a haptic "tap" to the operator to let the operator know that a certain point has been reached. This may avoid the operator from having to view a screen while interacting with the output shaft 22 and/or test specimen 26.

The material testing system 10 may represent any material testing system or load frame for testing materials. For example, the material testing system 10 may be a floor standing instrument or an instrument that is placed on a workbench or table. The material testing system 10 may represent systems having any output shaft range of motion, force range, frequency range or the like. The material testing system 10 may be capable of attaching test chamber instruments within which the shafts 22, 30 and clamps 24, 28 extend and within which the test specimen is housed in particular environmental conditions during testing. The material testing system 10 may include adjustability features or any features known in the art. Further, the linear motor 20 may be replaced by a rotational or torsion motor. In two motor systems whereby the base 14 houses a motor, both motors may be linear motors, or one motor may be a torsion motion for applying rotation on an output shaft, and thereby applying rotation to the test specimen via a rotating clamp. Any testing configuration is possible, and haptic feedback may be applicable to any output shaft in which an operator is required to manually manipulate, move, or configure during a setup or configuration stage of a testing sequence.

The material testing system 10 may further represent an instrument configured to test biological material by providing a testing chamber that simulates in vivo conditions. Furthermore, the material testing system 10 is shown with a single output shaft and single motor. In other embodiments, multiple output shafts and/or motors may be used with corresponding lower shaft and clamps for testing multiple test specimens simultaneously. In such embodiments, the haptic feedback system 12 may be configured to provide feedback to any shaft or actuator touched by an operator during manual setup.

Figure 2:
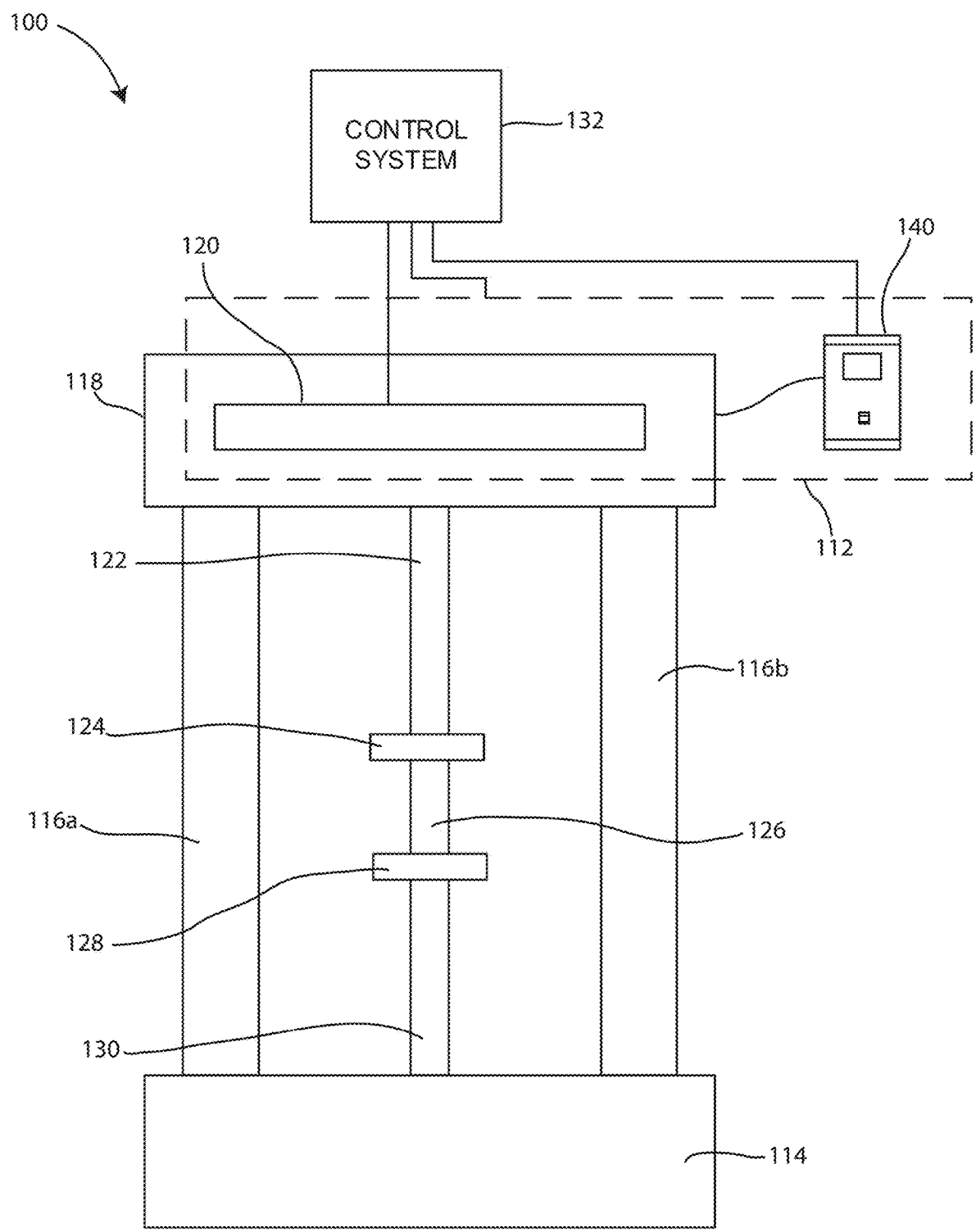
FIG. 2 depicts a schematic view of another material testing system having a haptic feedback system, in accordance with one embodiment.

It will be understood that haptic feedback systems, such as the haptic feedback system 12, may be applied to various different types of material testing systems. While FIG. 1 shows a schematic representation of a material testing system 10 that is an exemplary dynamic mechanical analysis (DMA) system whereby an operator directly engages with an output shaft, FIG. 2 depicts a schematic view of another material testing system 100 having another haptic feedback system 112, in accordance with one embodiment where an operator does not directly engage with the machine during setup. Instead, the material testing system 100 includes a machine having a controller 140 that allows for indirect interaction between an operator and the material testing system 100.

A material testing system configured with a controller that allows for indirect interaction with the system, such as the material testing system 100, may be particularly necessary in high force applications. In such applications, it may be unsafe for an operator to touch the machine or output shaft by hand. Instead, the controller 140 may include a system analogue (e.g. a scroll wheel, touch pad, joystick, or the like) that is used to adjust output shaft position indirectly.

Like the material testing system 10, the material testing system 100 includes a base 114 from which two frame posts 116a, 116b extend. The posts 116a, 116b extend to a linear motor housing unit 118 within which a linear motor 120 resides. Extending downward from the linear motor 120 and the housing unit 118 is a vertically aligned output shaft 122. The output shaft 122 extends to an upper clamp mechanism 124 that is configured to interface, hold or otherwise clamp a test specimen 126, which represents any sample testable by the material testing system 100. The test specimen 126 is held between the upper clamp mechanism 124 and a lower clamp mechanism 128 which extends from a lower shaft 130 that is attached to the base 14 and extends upward therefrom.

The haptic feedback system 112 of the material testing system 100 is shown encompassing each of the linear motor 120, the force and/or displacement sensors, and the indirect controller 140. The haptic feedback system 112 may further include some or all of the sensors in the material testing system 100, which may be the same as the sensors in the material testing system 10 described hereinabove. The haptic feedback system 112 may be configured to provide a haptic response to the controller 140, and particularly the analogue thereof. In some embodiments, this haptic feedback or tactile response may be configured to provide the operator with a simulated experience, to mimic or otherwise simulate the resistance of the test specimen 126 as the clamps 124, 128 come into contact. This haptic feedback could be based on measured loads and displacements from the force and/or displacement sensors of the material testing system 100.

Figure 3:
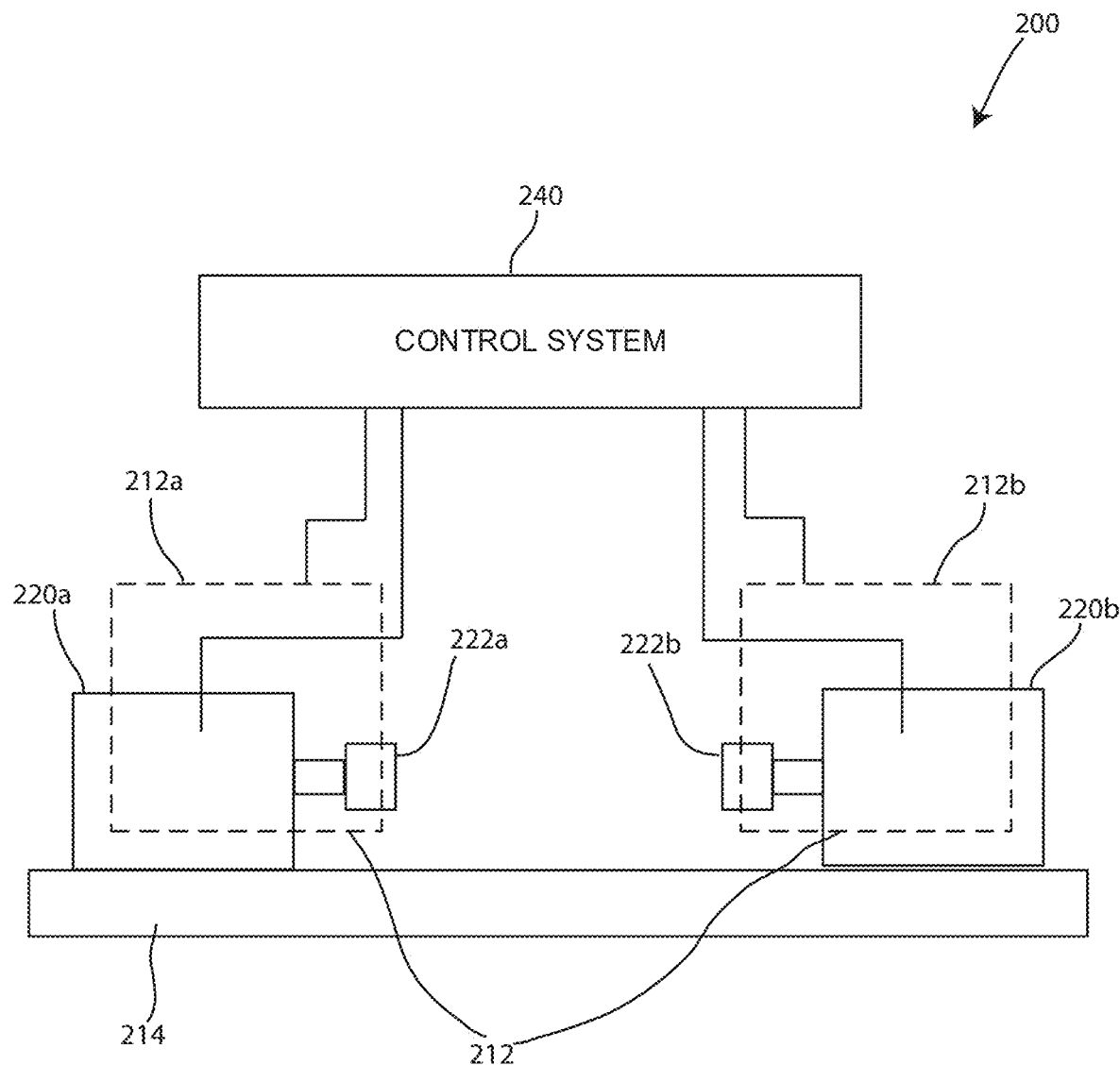
FIG. 3 depicts a schematic view of another material testing system having a haptic feedback system, in accordance with one embodiment.

FIG. 3 depicts a schematic view of another material testing system 200 having a haptic feedback system 212, in accordance with one embodiment. The material testing system 200 may be a horizontal testing system, rather than a vertical testing system like the material testing systems 10, 100 described hereinabove. The material testing system 200 includes a first motor 220a and a second motor 220b each located on a table or bench 214. The motors 220a, 220b, may be adjustably moved or relocated along the bench 214 in order to accommodate different tests. The two motors 220a, 220b may each be the same type of linear motor in the embodiment shown. In other embodiments, the motors 220a, 220b may be different. For example, one motor may be a linear motor while the other motor may be a torsion motor capable of applying rotation on the clamp and thereby rotating an attached test specimen. In still other embodiments, only a single motor may be necessary. In these embodiments, one of the motors 220a, 220b may be replaced by a stationary base that mounts to a stationary shaft.

The material testing system 200 includes a haptic feedback system 212 that comprises each of a haptic feedback system 212a and a haptic feedback system 212b. The haptic feedback system 212a is configured to provide haptic feedback or tactile responses along an output shaft 222a and/or clamp thereof, while the haptic feedback system 212b is configured to provide haptic feedback or tactile responses along an output shaft 222b and/or clamp thereof. This haptic feedback may be controlled by the control system 240, which may be configured to control each of the two motors 220a, 220b, and the haptic feedback in the haptic feedback system 212. The haptic feedback and tactile responses in the output shaft 222a, 222b may be provided in a similar manner to that described hereinabove in the previous embodiments.

Figure 4:
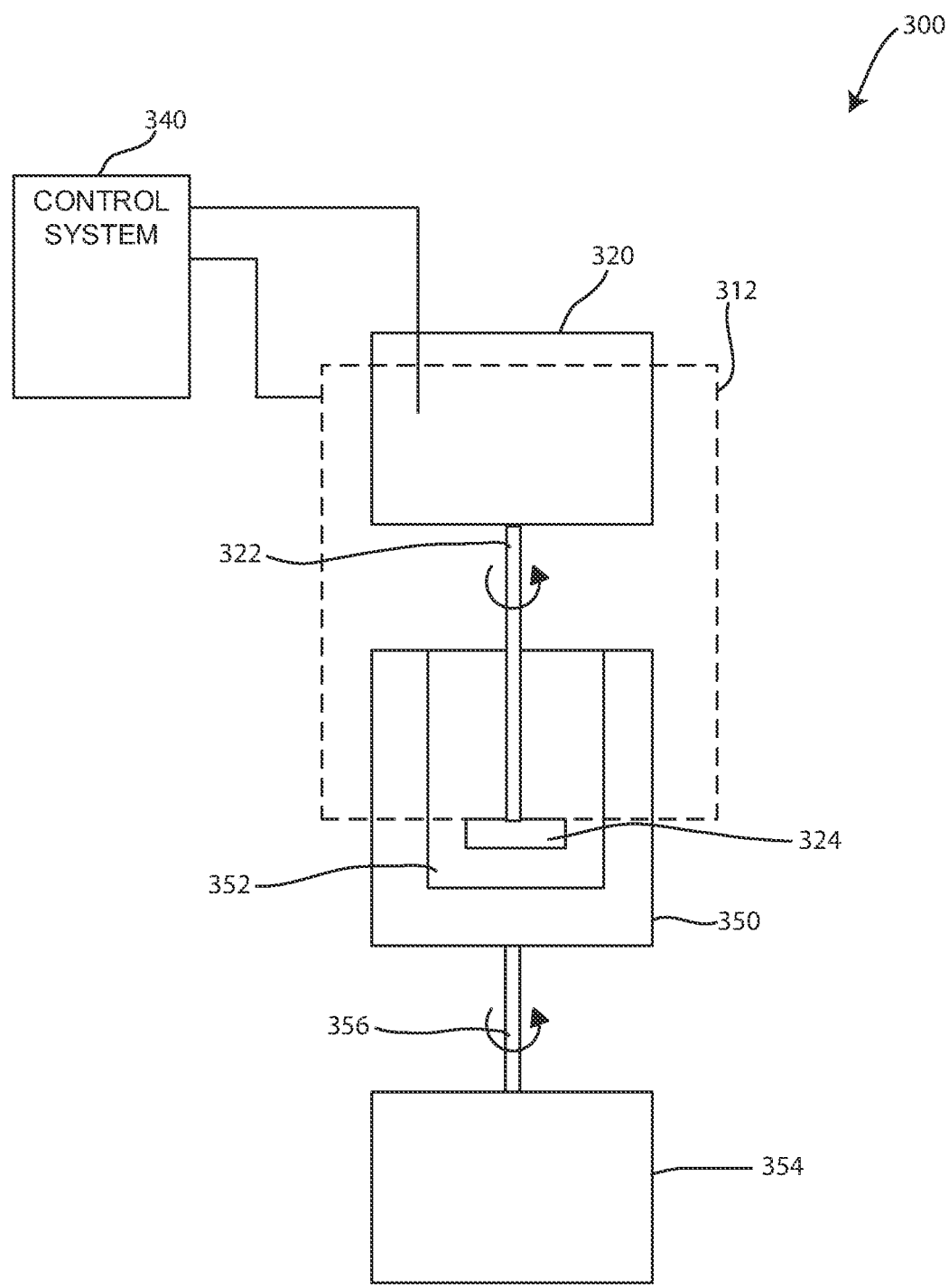
FIG. 4 depicts a schematic view of a rheometer having a haptic feedback system, in accordance with one embodiment.

FIG. 4 depicts a schematic view of a rheometer 300 having a haptic feedback system 312, in accordance with one embodiment. The rheometer 300 may include a drive motor 354 driving an output 356, and transducer(s) 320 having an output shaft 322. The transducer(s) 320 may include one or both of a torque rebalance transducer and a normal force rebalance transducer. A surrounding body 350 of a sample chamber 352 is shown attached to the output 356 of the drive motor 354, while a rotor 324 located within the sample chamber 352 is shown attached to the output 322 of the transducer(s) 320. A control system 340 is shown operably connected to each of the drive motor 354, the transducer(s) 320, and the haptic feedback system 312.

The drive motor 354 may be configured to deliver accurate rotational motion of the output 356 over a broad range of angular displacement and velocity. The drive motor 354 may, for example, include an air bearing system, a high-torque friction-free brushless DC motor, an optical encoder and a temperature sensing system. The drive motor 354 and the features thereof, may be controlled by the control system 340 based on operator input.

The transducer(s) 320 may include a torque rebalance transducer that may be configured to measure accurate sample stress based on the torque required on the output 322 to maintain a null position. The torque rebalance transducer may include an air bearing, a high resolution capacitive angle sensor, and a temperature sensing system. Like the drive motor 354, the torque rebalance transducer, and the features thereof, may be controlled by the control system 340 and directed by operator input. The transducer(s) 320 may include a normal force rebalance transducer that may be configured to measure accurate normal forces on the output 322 from a sample within the sample chamber 352. The normal force rebalance transducer may utilize position feedback to maintain the shaft of the output 322 in a null position. The normal force rebalance transducer, and the features thereof, may be controlled by the control system 340 and directed operator input. Additionally, the normal force rebalance transducer may be equipped with a pressure sensing system for measuring pressure in the sample chamber 352.

The surrounding body 350, the sample chamber 352 and the rotor 324 may be integral components of the rheometer 100. The rheometer may also include a compressed air system (not shown) for providing compressed air to the sample chamber 352. Alternatively, it is contemplated that these components are separately attachable add-on features of a pressure cell that is attachable to, and detachable from, to the outputs 322, 356. Whatever the embodiment, the surrounding body 350 defining the sample chamber 352 is attachable to the drive motor 354 and the output 356 thereof in order to rotate with the rotation of the output 356. Likewise, the rotor 324 is attachable to the output 322 of the transducers 320 and may be configured to move with movement of the output 322. The rotor 324 may be configured to rotate relative to the surrounding body 350 defining the sample chamber 352.

The control system 340 may be configured to control and monitor the stresses, strains, forces, velocities, and the like, on the components of the system. The control system 340 may be configured to provide output information related to measurements conducted during testing of materials or samples within the sample chamber 352. The control system 340 may be configured to control motion of the outputs 322, 356, and further control the pressure within the sample chamber 352 through control of the compressed air system (not shown).

The control system 340 may also be in operable communication with the haptic feedback system 312. The control system 340 may be configured to receive the information from the system in order to determine when, for example, the rotor 324 attached to the output shaft 322 is sufficiently submerged within a sample within the sample chamber 352. For example, in many embodiments the sample chamber 352 may be fully enclosed after the sample has been deposited therein. In such cases, it may be desirable for the output shaft to be lowered to a particular position below the depth of the sample. The control system 340 may be configured to receive sensed information from within the sample chamber 352 and may thereby provide haptic feedback when the output shaft 322 is lowered into the desired position relative to the depth of the sample. In some cases, for example, it may be desired for a top of the rotor 324 to be level with the sample depth. In other cases, it may be desirable for the top of the rotor 324 to be submerged a predetermined amount before the testing begins. The haptic feedback system 312 may be configured to provide the operator lowering the output shaft by hand a tactile response when the appropriate position is met. While this is one exemplary use of the haptic feedback 312 on the rheometer 300, any use in which it would be desirable to provide a signal to an operator touching the output shaft 322, or the output shaft 356, is contemplated.

Figure 5A:
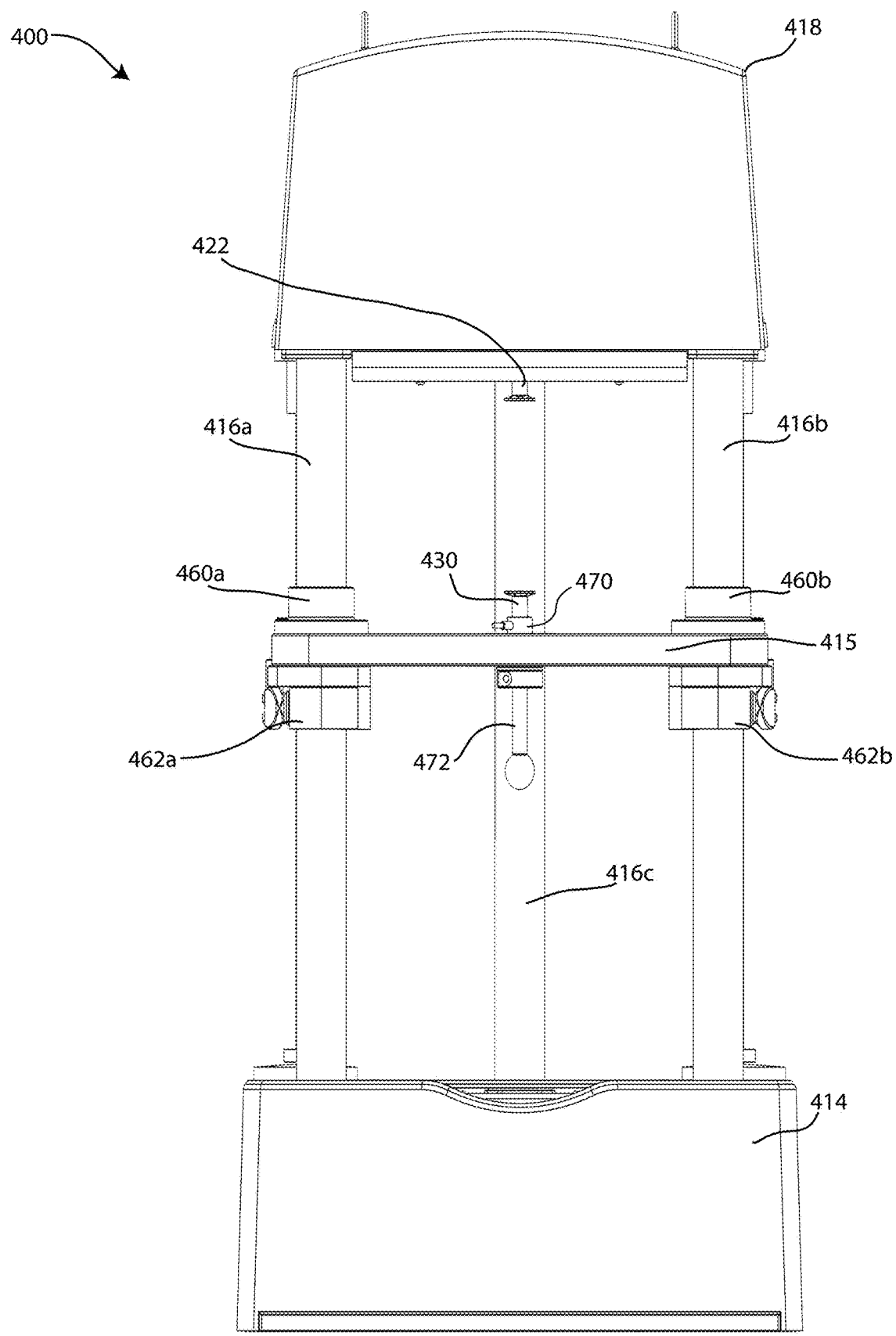
FIG. 5A depicts a side view of another material testing system with an output shaft in a retracted position, in accordance with one embodiment.

FIG. 5A depicts a side view of another material testing system 400 with an output shaft 422 in a retracted position, in accordance with one embodiment. The material testing system 400 may be an embodiment similar to the material testing system 10 described schematically hereinabove having described the control system 32 and the haptic feedback system 12.

The material testing system 400 may include a single motor (not shown) housed within a linear motor housing unit 418 that operates the output shaft 422. The upper housing 418 may also include appropriate sensors for providing information gathered from testing back to the control system (not shown). The material testing system 400 is shown prior to attachment of a specific clamp system to each of the ends of the output shaft 422, and a lower shaft 430. The lower shaft 430 is shown attached to the adjustable testing base 415 with a securing mechanism 472. One or more force sensors 470 are shown at the base of the lower shaft 430 which may be in communication with the control system 32.

The material testing system 400 includes a lower base 414 from which two side frame posts 416a, 416b and a back frame post 416c extend. The posts 416a, 416b, 416c extend to the linear motor housing unit 418 within which a linear motor (not shown) resides. Attached to and extending between each of the side posts 416a, 416b is an adjustable testing base 415 for changing the height of the lower shaft 430 relative to the upper output shaft 422. The adjustable testing base 415 includes a bearing system 460a, 460b for allowing slidable motion between the adjustable testing base 415 and the side posts 416a, 416b. The back frame post 416c may be located behind adjustable testing base 415 with sufficient clearance so as to not touch or otherwise interfere with movement of the adjustable testing base 415 along the side posts 416a, 416b. A locking mechanism 462a, 462b may be provided below the adjustable testing base 415 on each of the bearing systems 460a, 460b for locking the adjustable testing base 415 into position along the side frame posts 416a, 416b.

The material testing system 400 may include the haptic feedback system 12 shown schematically and described hereinabove with respect to FIG. 1. The haptic feedback system 12 may be configured to provide haptic feedback to the output shaft 422 in the manner described hereinabove with respect to FIG. 1. In some embodiments, it is contemplated that the haptic feedback system 12 may also provide a tactile response to an operator when adjusting the height of the adjustable testing base 415 along the side posts 416a, 416b, or in the attachment and adjustment of the lower shaft 430.

Figure 5B:
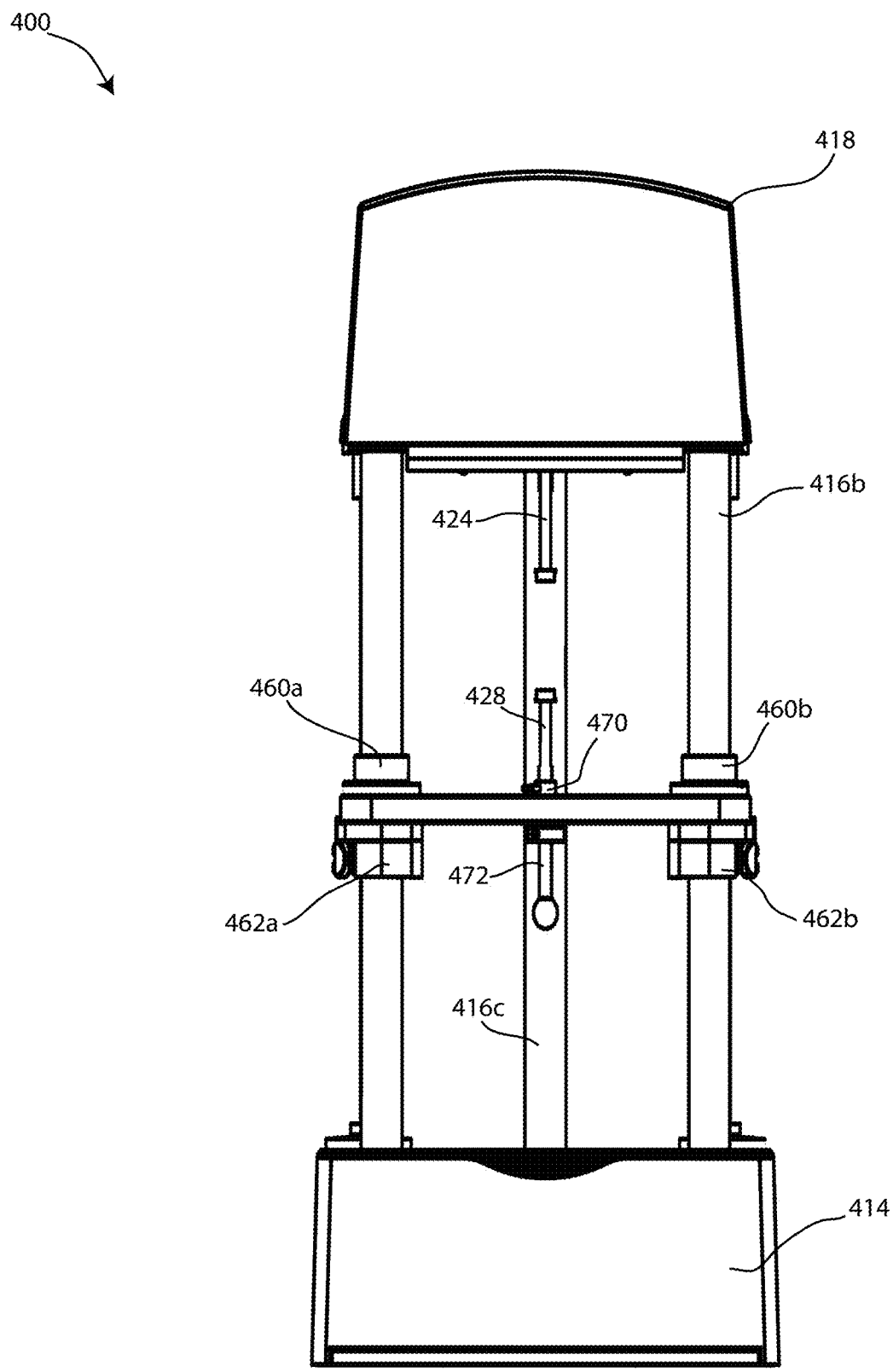
FIG. 5B depicts a side view of the material testing system of FIG. 5A with the output shaft in a retracted position with an attached clamp system, in accordance with one embodiment.
Figure 5C:
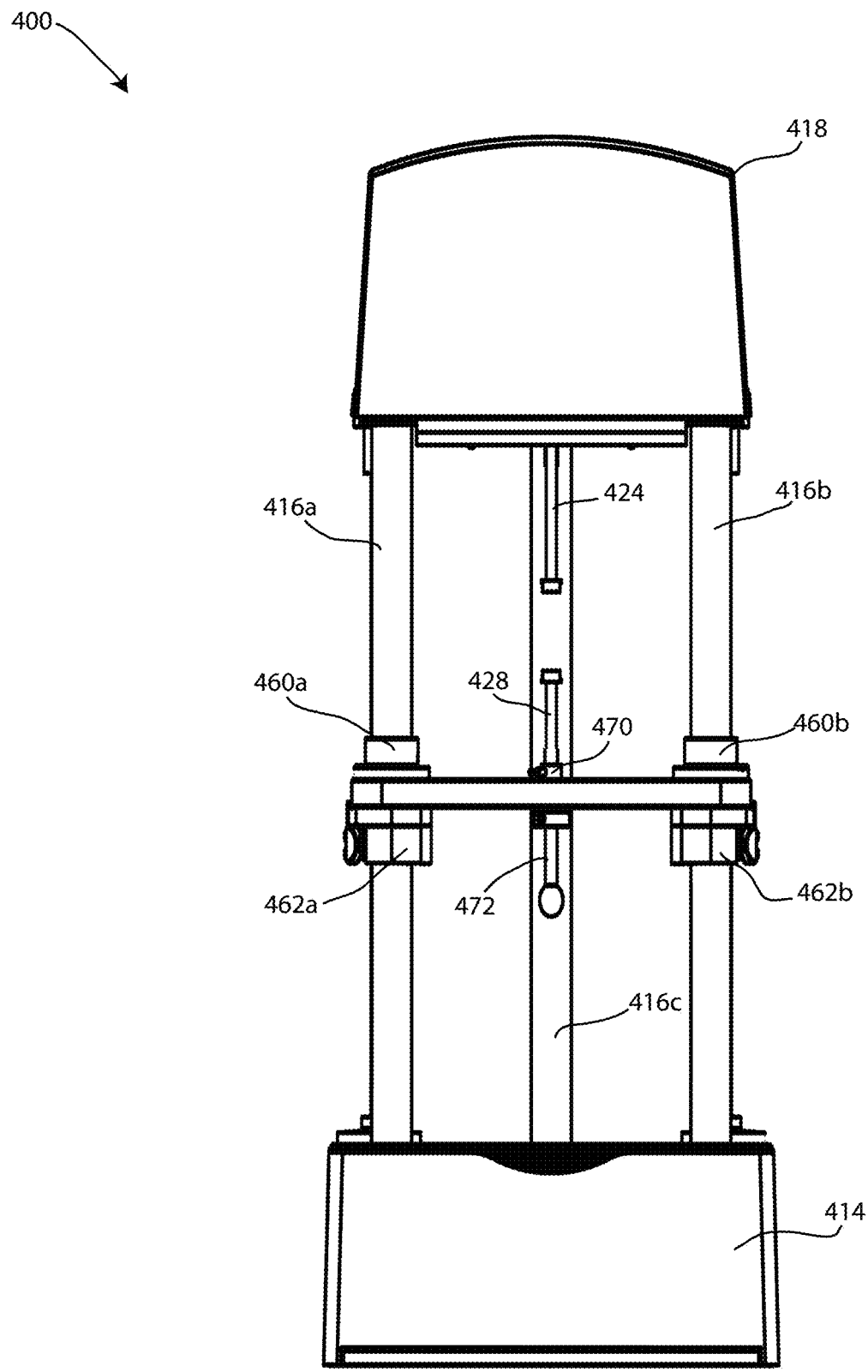
FIG. 5C depicts a side view of the material testing system of FIGS. 5A and 5B with the output shaft in an extended position with an attached clamp system, in accordance with one embodiment.

FIG. 5B depicts a side view of the material testing system 400 of FIG. 5A with the output shaft 422 in a retracted position with an attached clamp system, in accordance with one embodiment. The attached clamp system includes an upper clamp 424 that attaches to the output shaft 422 and includes an elongated shaft extending to a test specimen interface. Likewise, the attached clamp system includes a lower clamp 428 that attaches to the lower shaft 430 and includes an elongated shaft extending to a test specimen interface. The clamp system may be configured to receive a tactile response from the haptic feedback system 12 through any tactile responses sent to the output shaft 422 and/or lower shaft 430 thereof. It should be understood that the material clamp system shown is exemplary, and that the material testing systems may include any type of specimen interfaces known in the art. FIG. 5C depicts a side view of the material testing system 400 of FIGS. 5A and 5B with the output shaft 422 in an extended or lowered position with the attached clamp system, in accordance with one embodiment. As shown, the output shaft 422 may be moved or adjusted by hand up or down in order to move the upper clamp 424 closer to the lower clamp 428 in order to configure the material test system prior to testing.

Figure 6:
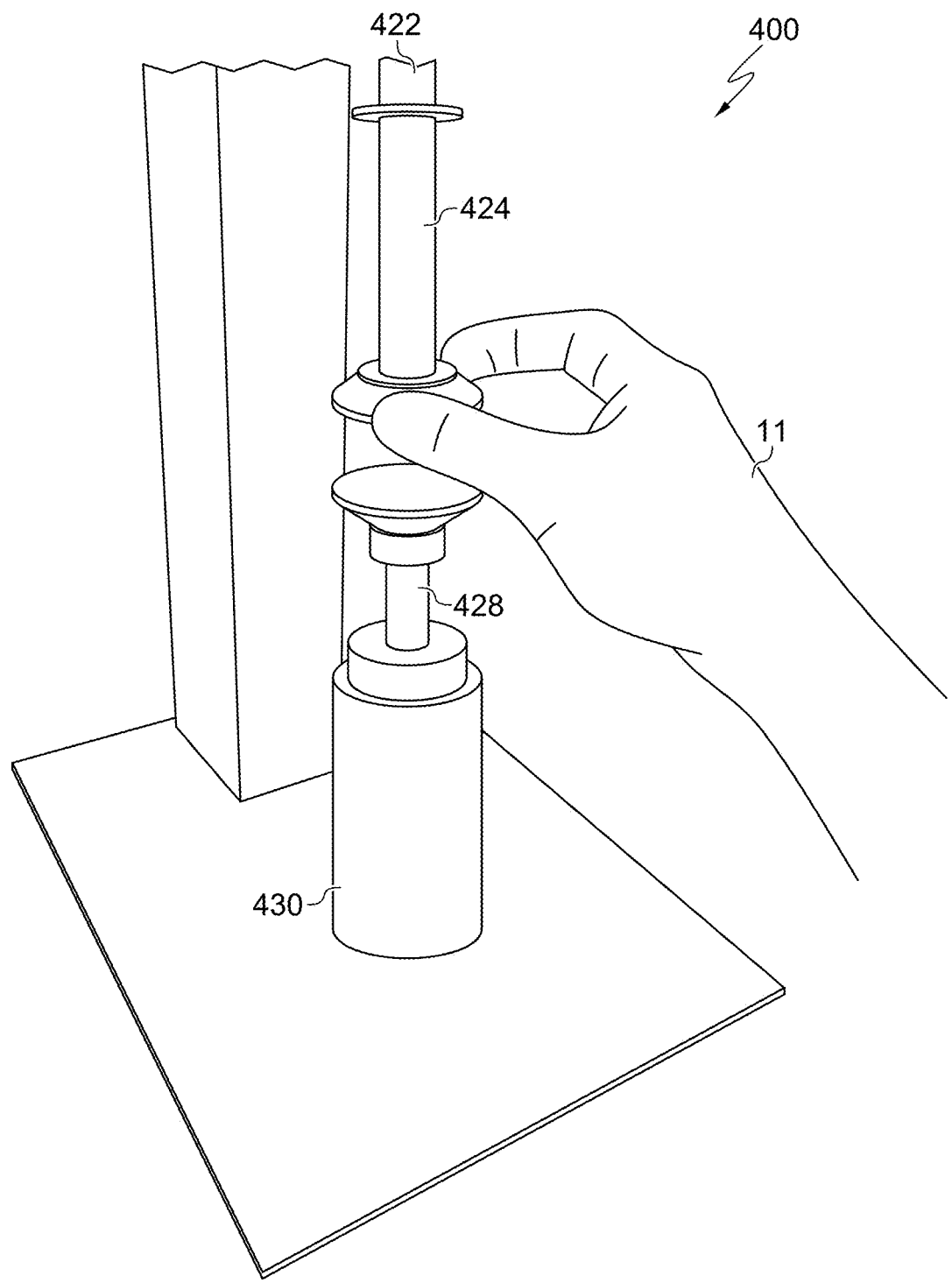
FIG. 6 depicts a perspective view of an operator of the material testing system of FIGS. 5A-5C receiving haptic feedback from the haptic feedback system, in accordance with one embodiment.

FIG. 6 depicts a perspective view of an operator 11 of the material testing system of FIGS. 5A-5C receiving haptic feedback or a tactile response from the haptic feedback system 12, in accordance with one embodiment. The operator 11 in this embodiment is shown touching the upper clamp 424 that is attached to the output shaft 422. A tactile response may be provided to the operator through the output shaft 422 and to the upper clamp 424 that is attached thereto in the form of a single "tap", multiple rapid "taps", a proportional resistive force, or the like. Various examples of tactile responses will be provided hereinbelow. The haptic feedback may indicate various things. For example, a single "tap" may indicate that a certain position in the output shaft or actuator has been met. Multiple taps may indicate that a limit in the displacement or load is reached (or nearly reached) to alert the operator 11 prior to over-traveling or over-loading. Proportional resistive forces may provide increased feedback or resistance to protect the operator 11 from bringing down the upper clamp 424 too far, i.e. too close to a known limit. Various tactile responses and corresponding meanings may be applied by the haptic feedback system 12 to communicate to the operator 11.

Figure 7:
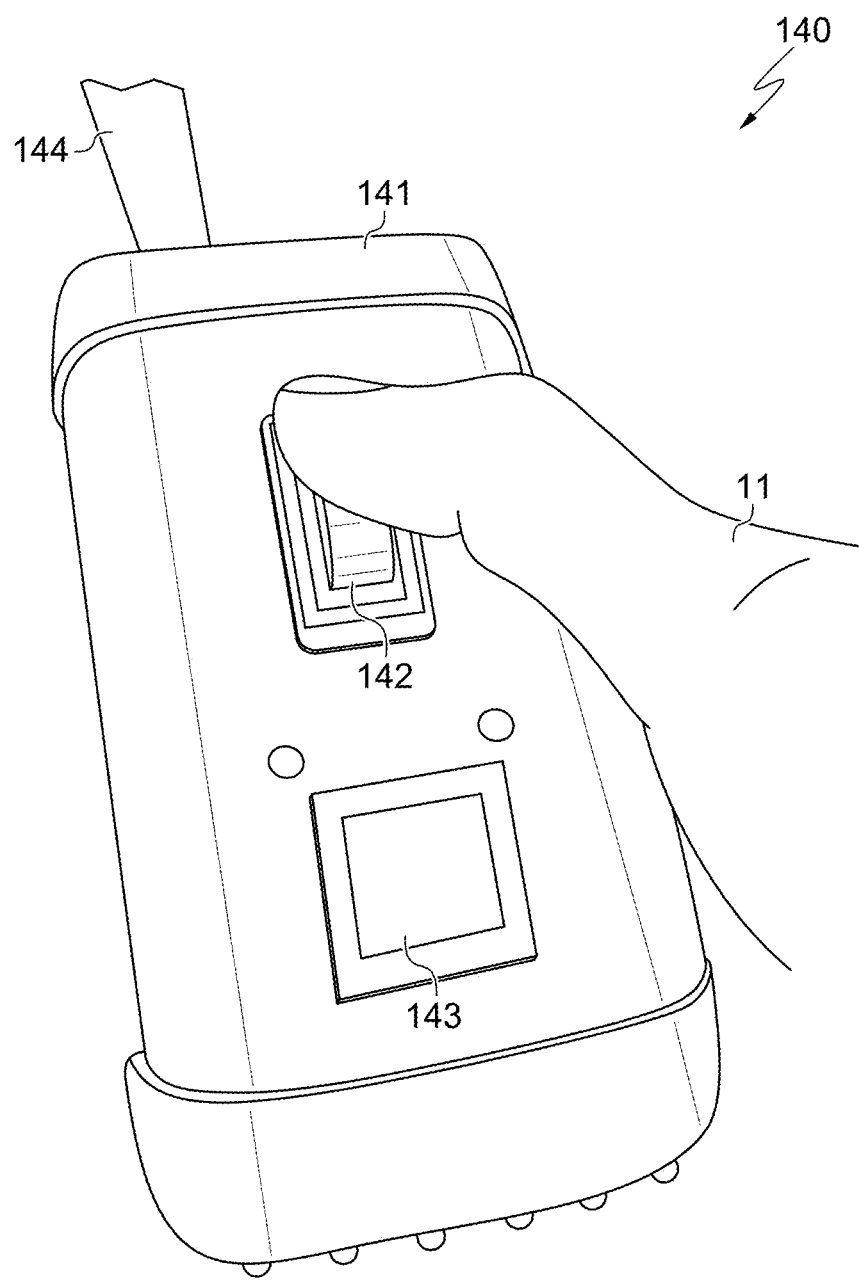
FIG. 7 depicts a perspective view of an operator of the material testing system of FIG. 2 holding an indirect controller and receiving haptic feedback from the haptic feedback system in accordance with one embodiment.

FIG. 7 depicts a perspective view of an operator of the material testing system of FIG. 2 holding the indirect controller 140 and receiving haptic feedback from the haptic feedback system 112 in accordance with one embodiment. The indirect controller 140 is shown having a system analogue 142 in the form of a movable toggle or dial. Further, the indirect controller 140 includes an emergency stop button 143. The indirect controller 140 includes a wire 144 that communicates to and from the control system 132 and the haptic feedback system 112. In material testing cases where the system is not practice or safe to actuate by hand (e.g. high force systems), the haptic feedback system 112 may be configured to provide haptic communications (i.e. tactile responses) to the operator 11 through the indirect controller 140. In addition to the taps or resistance provided by the output shafts described hereinabove in direct haptic feedback systems, the controller 140 may be configured to simulate what is happening in the test space. For example, resistance to motion of the controller analogue 142 may have a step-increase when the output shaft contacts a test specimen in the test space.

FIG. 8A depicts a graphical representation 500 of a haptic response 510 to reaching a position level by the output shaft 422 of the material testing system 400 of FIGS. 5A-6 over time. In particular, the abscissa 501 indicates time in seconds, while the ordinate 502 indicates the haptic level, measured in Volts. FIG. 8B depicts a graphical representation 550 of shaft position of the output shaft 422 of the material testing system 400 of FIGS. 5A-6 over the same time frame as the graphical representation of FIG. 8A. In particular, the abscissa 551 indicates time in seconds, across the same time period as the abscissa 501. The ordinate 552 indicates the shaft position of the output shaft 422 relative to a fully retracted position. As shown in FIG. 8A, a plot of the haptic response 510 that represents the haptic response over the time period in which the shaft is moving in FIG. 8B is shown having a first voltage "tap" 512, and a second voltage "tap" 514. Referring to FIG. 8B, the first voltage "tap" 512 occurs at a time when a plot 560 of the shaft position crosses the 10 mm point, at a time 562. This shaft position (10 mm) may be a threshold shaft position above which the haptic feedback system 12 may be configured to provide the haptic "taps" 512, 514. The second haptic "tap" 514 may be provided after a certain predetermined time interval passes while the shaft position remains above the threshold. Thus, a single "tap" 512, 514 may indicate that a position is met in the output shaft 422 (e.g., 10 mm). The "tap" is shown slowly repeating as the shaft remains above this 10 mm threshold.

FIG. 9A depicts a graphical representation 600 of a haptic response to crossing a position limit level by an output shaft of the material testing system of FIGS. 5A-6 over time. In particular, the abscissa 601 indicates time in seconds, while the ordinate 602 indicates the haptic level, measured in Volts. FIG. 9B depicts a graphical representation 650 of shaft position of the output shaft 422 of the material testing system 400 of FIGS. 5A-6 over the same time frame as the graphical representation of FIG. 9A. In particular, the abscissa 651 indicates time in seconds, across the same time period as the abscissa 501. The ordinate 652 indicates the shaft position of the output shaft 422 relative to a fully retracted position. As shown in FIG. 9A, a plot of the haptic response 610 that represents the haptic response over the time period in which the shaft is moving in FIG. 9B is shown having multiple rapid "taps" 612 across the time starting just after 3 seconds, until 10 seconds. Referring to FIG. 9B, the first voltage "tap" of the multiple continuous "taps" 612 occurs at a time when a plot 660 of the shaft position crosses the 10 mm point, at a time 662. This shaft position (10 mm) may be a threshold shaft position above which the haptic feedback system 12 may be configured to provide the continuous multiple haptic "taps" 612. These multiple rapid "taps" 612 may indicate to the operator 11 a limit in displacement or load is reached (or is nearly reached) to alert the operator 11 prior to over travel or over loading.

FIG. 10A depicts a graphical representation of a proportional haptic response to crossing a position limit level by the output shaft 422 of the material testing system 400 of FIGS. 5A-6 over time. Like the previous examples, the abscissa 701 indicates time in seconds, while the ordinate 702 indicates the haptic level, measured in Volts. FIG. 10B depicts a graphical representation of shaft position of the output shaft 422 of the material testing system 400 of FIGS. 5A-6 over the same time frame as the graphical representation of FIG. 10A. Like the previous examples, the abscissa 751 indicates time in seconds, across the same time period as the abscissa 701 and the ordinate 752 indicates the shaft position of the output shaft 422 relative to a fully retracted position. As shown in FIG. 10A, a plot of the haptic response 710 that represents the haptic response over the time period in which the shaft is moving in FIG. 10B is shown having a proportional, resistive force feedback that beings after the shaft position crosses the 10 mm point, at a time 762.

The increasing resistance occurs with an increasingly negative voltage applied to the output shaft 422 over a period 712 of the response in which the shaft position continues to increase beyond the 10 mm point. This negative voltage may be applicable in a tension sample case, whereby negative voltage lowers the shaft, while positive voltage raises the shaft. Thus, the negative voltage shown in FIG. 10A may actually be configured to lower the shaft to reduce the tension on the specimen. Just after 6 seconds, the shaft position stops increasing, shown at a section 764 of the plot 760 of the shaft position over time. During this time, the haptic response level remains at its negative maximum, at section 714 of the response 710, without changing. Increasing resistance in this manner may provide an operator with added protection as position approaches a maximum.

Figure 8:
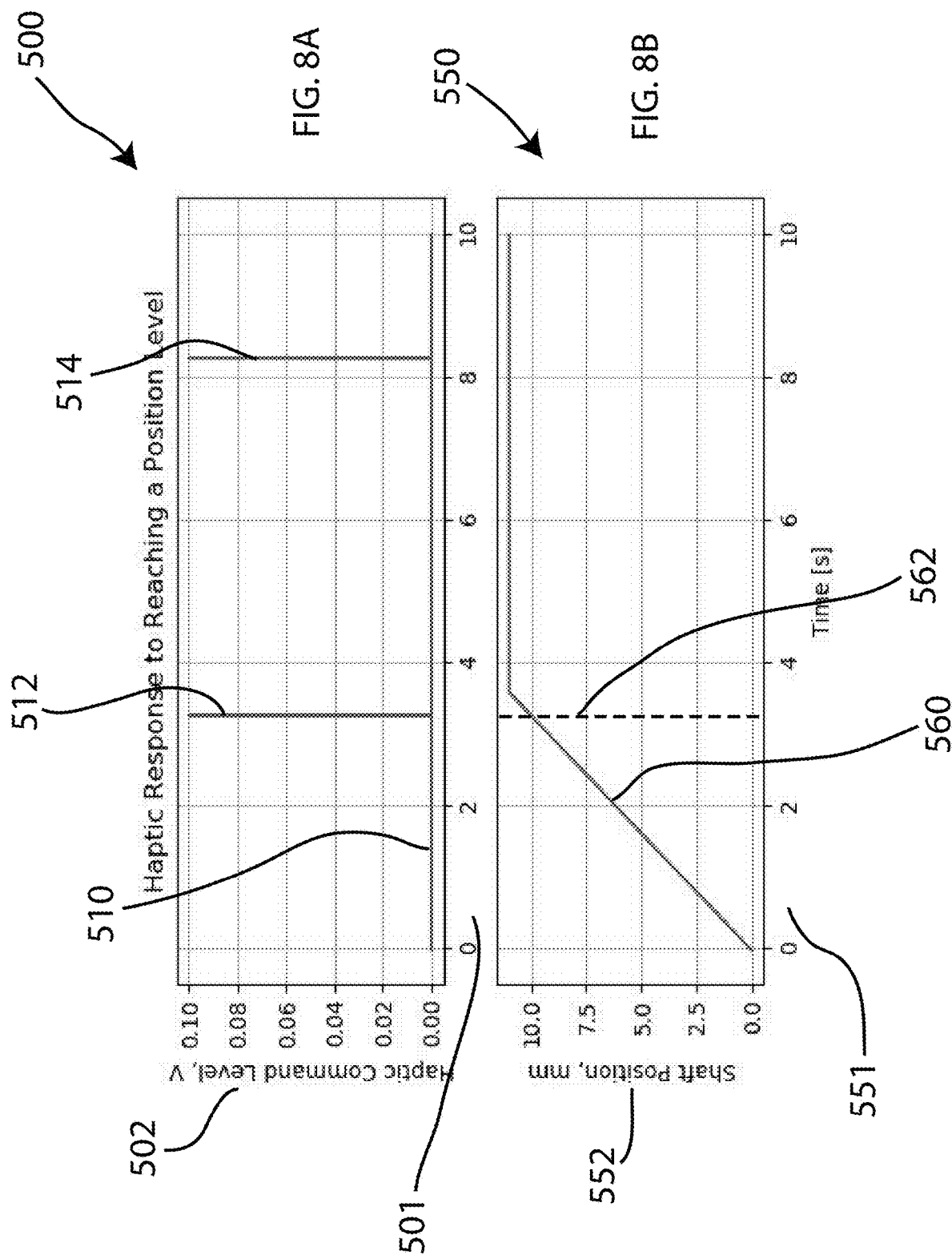
FIG. 8A depicts a graphical representation of a haptic response to reaching a position level by an output shaft of the material testing system of FIGS. 5A-6 over time.
FIG. 8B depicts a graphical representation of shaft position of the output shaft of the material testing system of FIGS. 5A-6 over the same time frame as the graphical representation of FIG. 8A.
Figure 9:
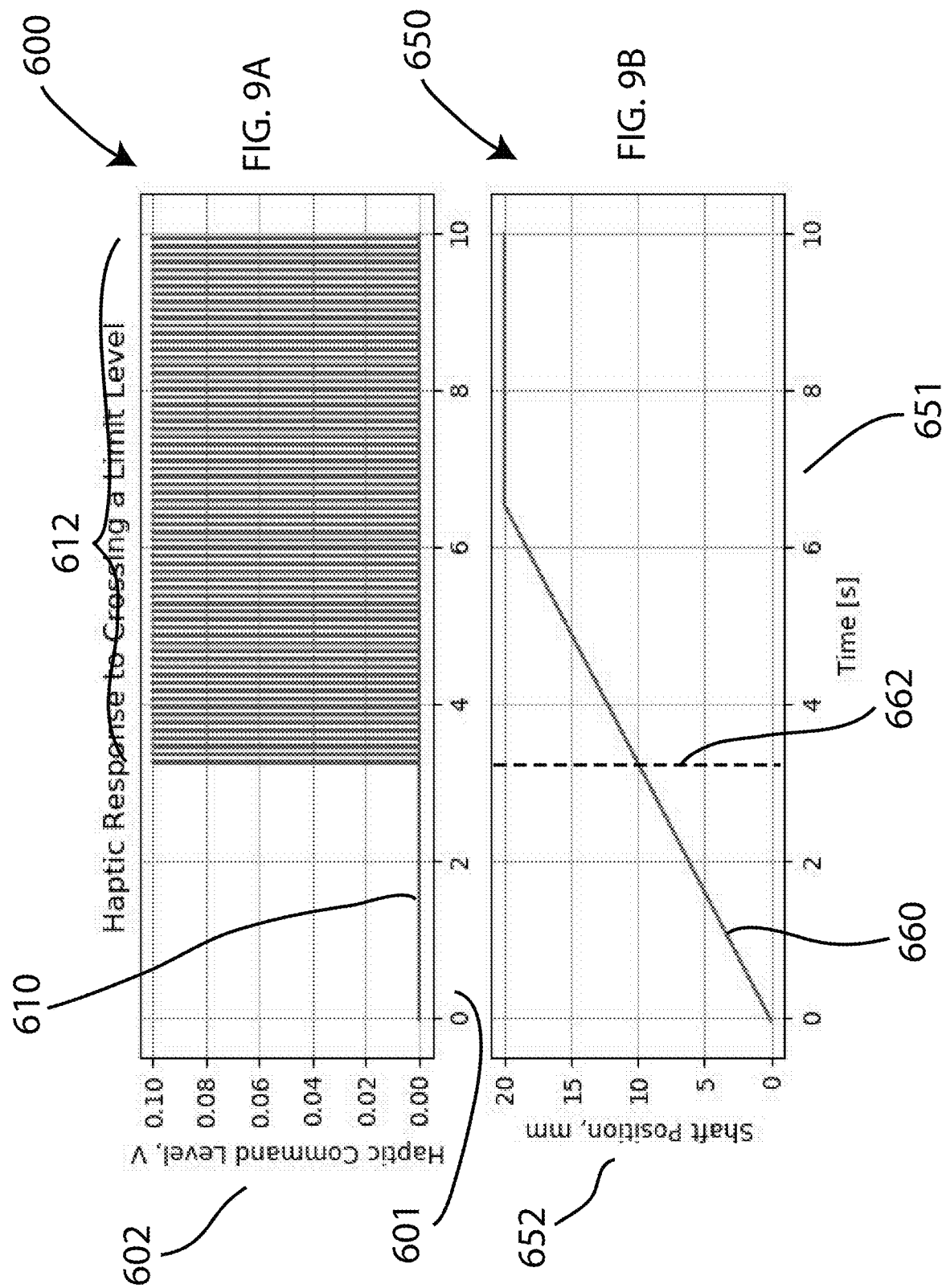
FIG. 9A depicts a graphical representation of a haptic response to crossing a position limit level by an output shaft of the material testing system of FIGS. 5A-6 over time.
FIG. 9B depicts a graphical representation of shaft position of the output shaft of the material testing system of FIGS. 5A-6 over the same time frame as the graphical representation of FIG. 9A.
Figure 10:
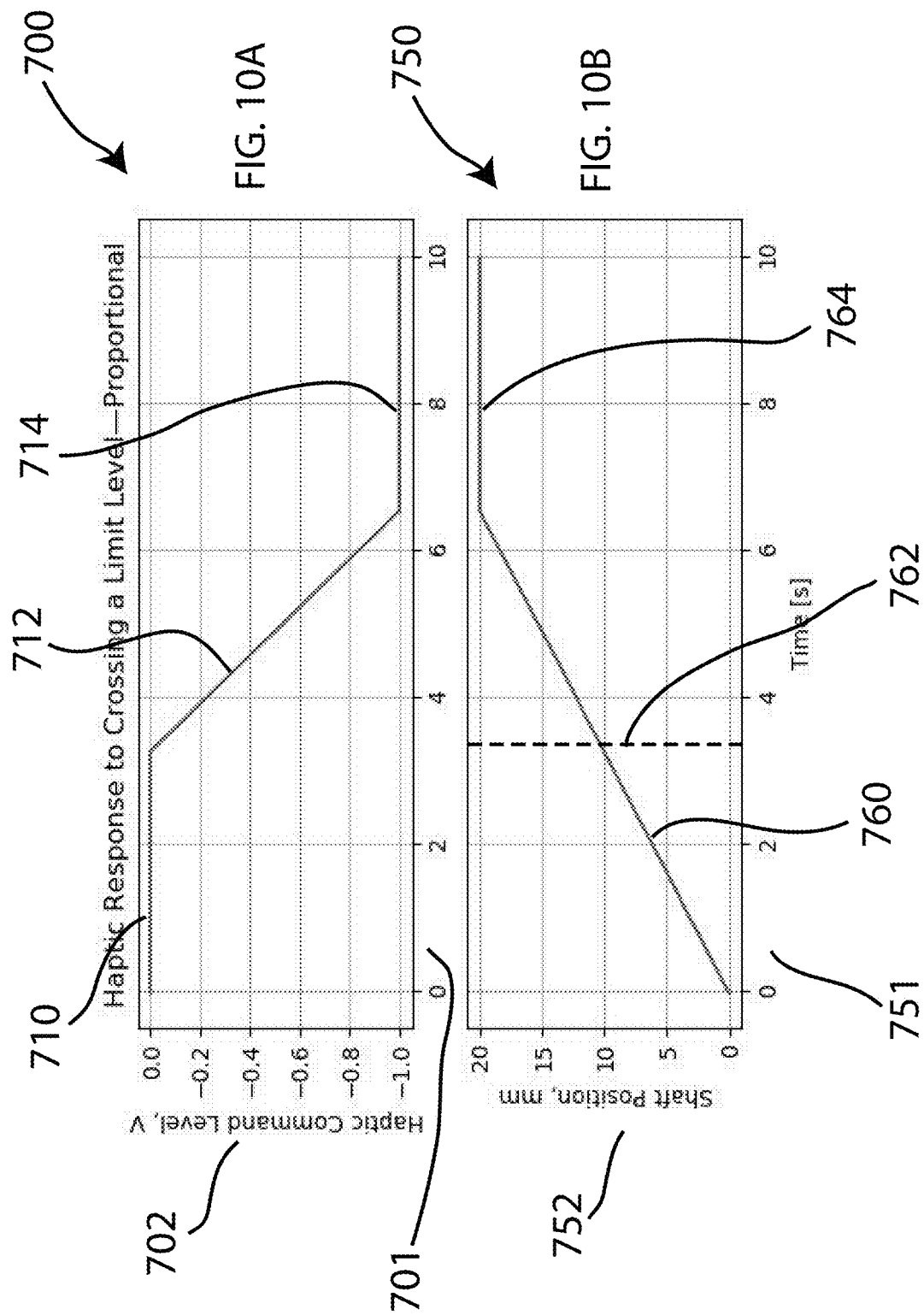
FIG. 10A depicts a graphical representation of a proportional haptic response to crossing a position limit level by an output shaft of the material testing system of FIGS. 5A-6 over time.
FIG. 10B depicts a graphical representation of shaft position of the output shaft of the material testing system of FIGS. 5A-6 over the same time frame as the graphical representation of FIG. 10A.

It should be understood that the voltages shown in FIGS. 8A, 9A, and 10A may be relative voltages related to increases or decreases in the voltage required to maintain the shaft "floating" in the intended current position. This shaft "floating" may require a known predetermined voltage depending on the position of the shaft. The voltage from the haptic feedback as shown in FIGS. 8A, 9A, 10A is configured to temporarily change the voltage by an amount that would provide a tactile response to the operator. While the above graphical examples in FIGS. 8A-10B have related to shaft position, the haptic feedback could similarly be applied in response to force information received by the control system of a material testing system, or any other sensed information received by the control system.

Figure 11:
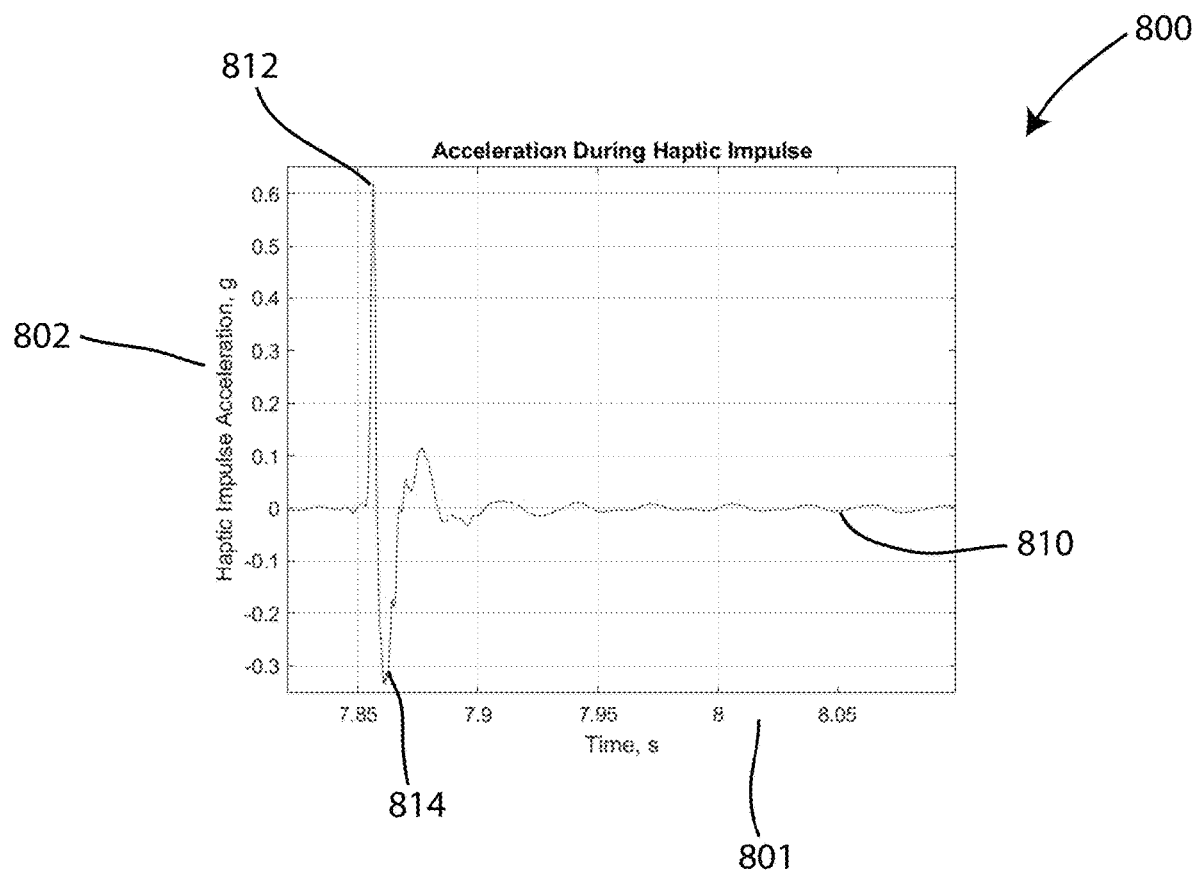
FIG. 11 depicts a graphical representation of an example acceleration of a haptic impulse over time.

FIG. 11 depicts a graphical representation 800 of an example acceleration plot 810 of a haptic impulse over time. The graphical representation 800 includes time along the abscissa 801, and the haptic impulse acceleration, measured in gravity (g), along the ordinate 802. The plot 810 includes a positive peak 812 at 0.6 g, while a negative peak 814 at −0.3 g. The acceleration plot 810 modulates over the course of about 0.05-0.1 seconds. This may be considered "low energy" feedback. Due to the short duration, only 0.003 J of mechanical energy may be output during the haptic response for a single low energy tap. Providing a haptic response that is low energy (e.g. less than 0.01 J) for mechanical testing systems may be particularly advantageous in situations in which a test specimen is already under contact or tension with the system and the haptic response is not intended to manipulate the test specimen, or the testing system, prior to testing.

As described above, methods of material testing, including setting up and configuring material testing systems and/or test sequences, are described. Methods of using haptic feedback in material testing may include providing a material testing system, such as one of the systems 10, 100, 200, 300, 400, including an output shaft, such as one of the output shafts 22, 122, 222a, 222b, 322, 422. Methods include receiving, by the material testing system, a test specimen, and setting up a test process for the test specimen by moving the output shaft relative to the test specimen. Methods include providing haptic feedback to an operator, such as the operator 11, of the material testing system related to a position or state of the output shaft relative to the test specimen during the setting up.

Methods further include providing, by the output shaft, the haptic feedback by way of a low energy vibration sent through the output shaft, such as that which is shown in FIG. 11 and described hereinabove. Methods may further include controlling the low energy vibration sent through the output shaft by a motor, such as one of the motors 20, 120, 220a, 220b, 320, 354 that is configured to move the output shaft during testing.

Methods may further include moving the output shaft by an indirect controller, such as the controller 140 used by the operator, and adjusting the position of the output shaft during setup with the indirect controller. Methods may include providing the haptic feedback to the operator by way of a tactile response sent through the indirect controller. Methods may further include simulating, by the indirect controller, a sample response in a test space of the material testing system by increasing the tactile response when the output shaft contacts the test specimen.

Methods may include at least one of performing, by the material test system, an axial load test on the test specimen; performing, by the material test system, a torsion loading test on the test specimen; performing, by the material test system, a dynamic mechanical analysis on the test specimen; and performing, by the material test system, a rheometric test on the test specimen.

Methods may further include providing a first tactile response to the operator; and indicating, with the first tactile response, that a position of the output shaft is met, such as the tactile response shown in FIGS. 8A and 8B. Methods may further include providing a second tactile response to the operator; and indicating, with the second tactile response, a movement limit of the output shaft for the setup. The second tactile response is different than the first tactile response, such as the tactile response shown in FIGS. 9A and 9B.

Methods may still further include providing at least one of a single pulse, such as the response shown in FIGS. 8A and 8B, providing rapid successive pulses, such as the response shown in FIGS. 9A and 9B, providing an increased resistive force to further movement of the output shaft, such as the response shown in FIGS. 10A and 10B, providing pulses that repeat at predetermined time intervals, such as the response shown in FIGS. 8A and 8B, and providing a resistive force that is proportional to position of the output shaft, such as the response shown in FIGS. 10A and 10B.

While the invention has been shown and described with reference to specific embodiments, it should be understood by those skilled in the art that various changes in form and detail may be made therein without departing from the spirit and scope of the invention as recited in the accompanying claims. For example, in some embodiments, the removable seal device may not include a support sleeve, or may include a support sleeve that is not made of a metallic material. Other variations are contemplated without departing from the scope of inventions described herein.

What is claimed is:

1. A material testing system comprising:
a motor;
a control system connected to the motor and configured to control the material testing system prior to and during a testing sequence;
an output shaft configured to be moved by operation of the motor, the output shaft coupleable to a test specimen such that movement of the output shaft imparts a mechanical force on the test specimen, wherein the motor is configured to operate the output shaft to move the output shaft across a range of motion, at a force range, and in a frequency range such that the output shaft applies force and motion at a frequency to the test specimen as controlled by the control system;
a haptic feedback system configured to provide an operator of the material testing system haptic feedback related to a position or state of the output shaft relative to the test specimen during setup; and
a load frame supporting the output shaft, the load frame including a unit housing the motor and at least one frame post aligned with the output shaft.

2. The material testing system of claim 1, wherein the output shaft is configured to provide the haptic feedback to the operator by way of a tactile response sent through the output shaft.

3. The material testing system of claim 2, wherein the tactile response includes moving the output shaft by the motor.

4. The material testing system of claim 2, wherein the tactile response is a low energy vibration in the output shaft.

5. The material testing system of claim 1, wherein the output shaft is movable by an indirect controller used by the operator, wherein the indirect controller is configured to adjust the position of the output shaft during setup, and wherein the indirect controller is configured to provide the haptic feedback to the operator by way of a tactile response sent through the indirect controller.

6. The material testing system of claim 5, wherein the tactile response is configured to simulate a sample response in a test space of the material testing system by increasing the tactile response when the output shaft contacts the test specimen.

7. The material testing system of claim 1, wherein the material testing system is at least one of an axial loading system, a torsion loading system, a dynamic mechanical analysis system, and a rheometer system.

8. The material testing system of claim 1, wherein the haptic feedback system is configured to provide a first tactile response to indicate that a position of the output shaft or load on a sample is met.

9. The material testing system of claim 8, wherein the haptic feedback system is configured to provide a second tactile response at or near a movement or force limit of the output shaft for the setup, wherein the second tactile response is different than the first tactile response.

10. The material testing system of claim 9, wherein the first and second tactile responses are responses selected from the group consisting of a single pulse, rapid successive pulses, an increased resistive force to further movement of the output shaft, pulses that repeat at predetermined time intervals, and a resistive force that is proportional to position of the output shaft.

11. A material testing system comprising:
a motor;
a control system connected to the motor and configured to control the material testing system prior to and during a testing sequence;
a first specimen contact body;
a second specimen contact body, wherein a test specimen is configured to be placed between the first specimen contact body and the second specimen contact body;
an output shaft attached to and extending from the first specimen contact body, the output shaft configured to be moved by operation of the motor, wherein the output shaft is configured to provide haptic feedback to an operator touching the output shaft during setup of a test process, wherein the motor is configured to operate the output shaft to move the output shaft across a range of motion, at a force range, and in a frequency range such that the output shaft applies force and motion at a frequency to the test specimen as controlled by the control system; and
a load frame supporting the output shaft, the load frame including a unit housing the motor and at least one frame post aligned with the output shaft.

12. A method of material testing comprising:
providing a material testing system including a motor, a control system connected to the motor, an output shaft, and a load frame supporting the output shaft, the load frame including a unit housing the motor and at least one frame post aligned with the output shaft;
receiving, by the material testing system, a test specimen;
setting up, using the control system, a test process for the test specimen by moving the output shaft relative to the test specimen;
providing haptic feedback to an operator of the material testing system related to a position or state of the output shaft relative to the test specimen during the setting up;
moving, by the motor, the output shaft across a range of motion, at a force range, and in a frequency range; and
applying, by the output shaft, force and motion at a frequency to the test specimen as controlled by the control system.

13. The method of claim 12, further comprising:
providing, by the output shaft, the haptic feedback by way of a low energy vibration sent through the output shaft.

14. The method of claim 13, further comprising:
controlling the low energy vibration sent through the output shaft by the motor that is configured to move the output shaft during testing.

15. The method of claim 12, further comprising:
moving the output shaft by an indirect controller used by the operator;
adjusting the position of the output shaft during setup with the indirect controller; and
providing the haptic feedback to the operator by way of a tactile response sent through the indirect controller.

16. The method of claim 15, further comprising:
simulating, by the indirect controller, a sample response in a test space of the material testing system by increasing the tactile response when the output shaft contacts the test specimen.

17. The method of claim 12, further comprising at least one of:
performing, by the material testing system, an axial load test on the test specimen;
performing, by the material testing system, a torsion loading test on the test specimen;
performing, by the material testing system, a dynamic mechanical analysis on the test specimen; and
performing, by the material testing system, a rheometric test on the test specimen.

18. The method of claim 12, further comprising:
providing a first tactile response to the operator; and
indicating, with the first tactile response, that a position of the output shaft is met.

19. The method of claim 18, further comprising:
providing a second tactile response to the operator; and
indicating, with the second tactile response, a movement limit of the output shaft for the setup, wherein the second tactile response is different than the first tactile response.

20. The method of claim 19, wherein the providing the first tactile response and the second tactile response further comprising at least one of:
providing at least one of a single pulse;
providing rapid successive pulses;
providing an increased resistive force to further movement of the output shaft;
providing pulses that repeat at predetermined time intervals; and
providing a resistive force that is proportional to position of the output shaft.

* * * * *